(12) United States Patent
Chang et al.

(10) Patent No.: US 11,014,684 B2
(45) Date of Patent: May 25, 2021

(54) EXPEDITED PREFLIGHT READINESS SYSTEM FOR AIRCRAFT

(71) Applicant: Textron Aviation Inc., Wichita, KS (US)

(72) Inventors: Vernon Weng-Yew Chang, Wichita, KS (US); Charles Bernard Beuning, Wichita, KS (US); Adam Blake Wolfe, Bentley, KS (US); Phuong Ngoc Ta, Wichita, KS (US); Mark Christopher Hansen, Wichita, KS (US)

(73) Assignee: Textron Innovations, Inc., Providence, RI (US)

( * ) Notice: Subject to any disclaimer, the term of this patent is extended or adjusted under 35 U.S.C. 154(b) by 394 days.

(21) Appl. No.: 15/927,228

(22) Filed: Mar. 21, 2018

(65) Prior Publication Data

US 2018/0273209 A1 Sep. 27, 2018

Related U.S. Application Data

(60) Provisional application No. 62/474,294, filed on Mar. 21, 2017, provisional application No. 62/474,303, (Continued)

(51) Int. Cl.
*B64D 41/00* (2006.01)
*H02J 1/00* (2006.01)
(Continued)

(52) U.S. Cl.
CPC ............. *B64D 41/00* (2013.01); *B64D 13/06* (2013.01); *B64D 45/00* (2013.01); *B64F 5/40* (2017.01); *B64F 5/60* (2017.01); *G01F 9/001* (2013.01); *G05D 1/0011* (2013.01); *G07C 5/008* (2013.01); *H01M 50/20* (2021.01); *H02J 1/00* (2013.01); *H02J 1/10* (2013.01); *H02J 7/007* (2013.01);
(Continued)

(58) Field of Classification Search
USPC ........................................................ 701/29.1
See application file for complete search history.

(56) References Cited

U.S. PATENT DOCUMENTS

| 6,624,533 B1 | 9/2003 | Swanson et al. |
| 6,912,453 B2 | 6/2005 | Le Draoullec et al. |

(Continued)

*Primary Examiner* — Maceeh Anwari
(74) *Attorney, Agent, or Firm* — Erise IP, P.A.

(57) ABSTRACT

An expedited preflight readiness system for aircraft includes a power source having one or more battery modules for storing electrical power. An integrated controller is electrically and communicatively coupled with the power source for monitoring and controlling the power source to provide electrical power to aircraft subsystems. A mobile device is communicatively coupled with the integrated controller for communicating instructions to the integrated controller for initiating preflight readiness of the aircraft and for monitoring preflight readiness. A method for preconditioning an aircraft includes determining a state-of-charge of an APU and activating an environmental control subsystem for preconditioning the aircraft by adjusting a current temperature according to a preconditioning profile based on one or more of a target temperature, a target time, the current temperature, an outside air temperature, an amount of energy, and a state-of-charge of the APU.

20 Claims, 13 Drawing Sheets

Related U.S. Application Data filed on Mar. 21, 2017, provisional application No. 62/474,310, filed on Mar. 21, 2017.

(51) Int. Cl.

| | | |
|---|---|---|
| *B64D 13/06* | (2006.01) | |
| *H02J 7/00* | (2006.01) | |
| *G05D 1/00* | (2006.01) | |
| *H02M 7/44* | (2006.01) | |
| *H02J 7/14* | (2006.01) | |
| *B64F 5/40* | (2017.01) | |
| *H02J 1/10* | (2006.01) | |
| *H01M 50/20* | (2021.01) | |
| *B64F 5/60* | (2017.01) | |
| *B64D 45/00* | (2006.01) | |
| *G01F 9/00* | (2006.01) | |
| *G07C 5/00* | (2006.01) | |
| *H01M 10/42* | (2006.01) | |
| *H01M 50/50* | (2021.01) | |
| *H01M 50/543* | (2021.01) | |

(52) U.S. Cl.
CPC .......... *H02J 7/0063* (2013.01); *H02J 7/1423* (2013.01); *H02M 7/44* (2013.01); *B64D 2013/0611* (2013.01); *B64D 2041/002* (2013.01); *B64D 2045/0085* (2013.01); *B64D 2221/00* (2013.01); *H01M 10/425* (2013.01); *H01M 50/50* (2021.01); *H01M 50/543* (2021.01); *H01M 2010/4271* (2013.01); *H01M 2220/20* (2013.01); *Y02T 50/40* (2013.01); *Y02T 50/50* (2013.01)

(56) References Cited

U.S. PATENT DOCUMENTS

| | | |
|---|---|---|
| 7,983,809 B2 | 7/2011 | Kell et al. |
| 8,061,650 B2 | 11/2011 | Nguyen et al. |
| 8,694,235 B2 | 4/2014 | Eadie |
| 2010/0042283 A1* | 2/2010 | Kell ............... G06Q 10/06 701/29.3 |
| 2012/0198875 A1 | 8/2012 | Tate, Jr. et al. |
| 2013/0179057 A1* | 7/2013 | Fisher ............... B60L 53/68 701/117 |
| 2014/0210399 A1 | 7/2014 | Urschel et al. |
| 2014/0287273 A1 | 9/2014 | Nguyen et al. |
| 2016/0046158 A1 | 2/2016 | Keller et al. |
| 2016/0204615 A1 | 7/2016 | Radun et al. |
| 2018/0357909 A1* | 12/2018 | Eyhorn ............... G08G 5/0013 |

\* cited by examiner

US 11,014,684 B2

EXPEDITED PREFLIGHT READINESS SYSTEM FOR AIRCRAFT

CROSS-REFERENCE TO RELATED APPLICATIONS

This application claims the benefit of each of U.S. Provisional Application No. 62/474,294 entitled Expedited Preflight Readiness System for Aircraft and filed on Mar. 21, 2017; U.S. Provisional Application No. 62/474,303 entitled Hybrid Auxiliary Power Unit for Connected Aircraft and filed on Mar. 21, 2017; and, U.S. Provisional Application No. 62/474,310 entitled Hot-Swappable Hybrid APU for Aircraft and filed on Mar. 21, 2017. The entireties of each of the aforementioned applications are incorporated by reference herein.

BACKGROUND

1. Field

Embodiments of this disclosure relate generally to systems and methods for preparing aircraft for flight, and more specifically to systems and methods for remotely initiating automatic preflight preparations of aircraft.

2. Description of the Related Art

Conventionally, flight crew manually prepare aircraft subsystems prior to departure, which limits how quickly an aircraft may be ready for departure following arrival of the crew. Some prior art systems enable users to receive aircraft data remotely.

U.S. Pat. No. 7,983,809 to Kell et al. discloses an aircraft integrated support system that downloads vehicle data, processes the data to determine aircraft system status, and displays maintenance information to maximize aircraft readiness.

US Patent Publication 2016/0046158 to Keller et al. discloses a system for measuring aircraft tire pressure and wirelessly transmitting tire pressure information.

U.S. Pat. No. 6,912,453 to Draoullec et al. discloses a device for monitoring aircraft systems, detecting a system failure, and displaying a list of tasks to perform and tasks already performed to address the detected failure.

SUMMARY

In an embodiment, an expedited preflight readiness system for aircraft is provided. The system includes a power source having one or more battery modules for storing electrical power, the power source being electrically coupled to a plurality of aircraft subsystems for enabling preflight readiness. An integrated controller is electrically and communicatively coupled with the power source for monitoring and controlling the power source to provide electrical power to one or more of the plurality of aircraft subsystems, and a mobile device is communicatively coupled with the integrated controller via a server. The mobile device is capable of displaying information about the plurality of subsystems for monitoring preflight readiness and for communicating instructions to the integrated controller for initiating preflight readiness.

In another embodiment, a method for preconditioning an aircraft is provided. The aircraft includes an integrated controller electrically and communicatively coupled with a plurality of aircraft subsystems. The method includes receiving a selection for a target temperature and a target time, measuring a current temperature and an outside air temperature, calculating an amount of energy to reach the target temperature based on the current temperature, the target temperature, the outside air temperature, and the target time. The method further includes determining a state-of-charge of an auxiliary-power-unit (APU) and activating an environmental control subsystem for preconditioning the aircraft by adjusting the current temperature according to a preconditioning profile based on one or more of the target temperature, the target time, the current temperature, the outside air temperature, the amount of energy, and the state-of-charge of the APU.

In yet another embodiment, an expedited preflight readiness method for an aircraft is provided. The method includes sending a signal via a mobile device to a server and determining whether the signal is a request for data or a command to operate an aircraft subsystem. When the signal is a request for data, the method includes searching aircraft diagnostic data of the server for requested data and transmitting requested data from the server to the mobile device for display. When the signal is a command, the method includes transmitting the command to an integrated controller for operating aircraft subsystems for preflight readiness and transmitting status of the subsystems to the mobile device for displaying progress of preflight readiness.

BRIEF DESCRIPTION OF THE DRAWINGS

Illustrative embodiments of the present disclosure are described in detail below with reference to the attached drawing figures, which are incorporated by reference herein and wherein.

DETAILED DESCRIPTION

To prepare an aircraft for dispatch on a flight mission, the flight crew needs to perform pre-flight checks. The checks may consist of verifying that aircraft systems, structure, and flight controls are ready for flight and that the cockpit and cabin have been prepared for crew members and passengers to comfortably enter. Some of these aircraft system checks include checking engine oil level, tire pressure, fuel quantity, state-of-charge of any electrical system source (e.g., a main or auxiliary battery, or hydrogen gas level for fuel-cell power systems). Prior to dispatch, if these levels are determined to be low, the flight crew will have to request that mechanics of a fixed-base operator (FBO) at the airport replenish the levels.

In cold weather, some batteries may need to be preheated to a minimum operating temperature prior to departure. In hot or cold weather, the cockpit/cabin may need to be preconditioned (e.g., precooled in hot weather or preheated in cold weather) to provide a comfortable environment for passengers. If these preflight tasks cannot be started until the flight crew arrives, departure delays will ensue. Alternatively, arrival of the flight crew may occur well before arrival of the passengers.

In conventional aircraft, subsystems are typically activated by having flight crew or maintenance personnel in the cockpit to actuate switches. Once activated, these subsystems operate continuously until turned off or until the power source has been disconnected. A capability is lacking to set readiness targets for aircraft subsystems at a specific clock time (e.g., an expected time for flight crew arrival at the aircraft). Without establishing a timeframe for preflight readiness, a timeframe is lacking for optimizing energy usage to minimize energy consumption during unattended ground operations.

Figure 1:
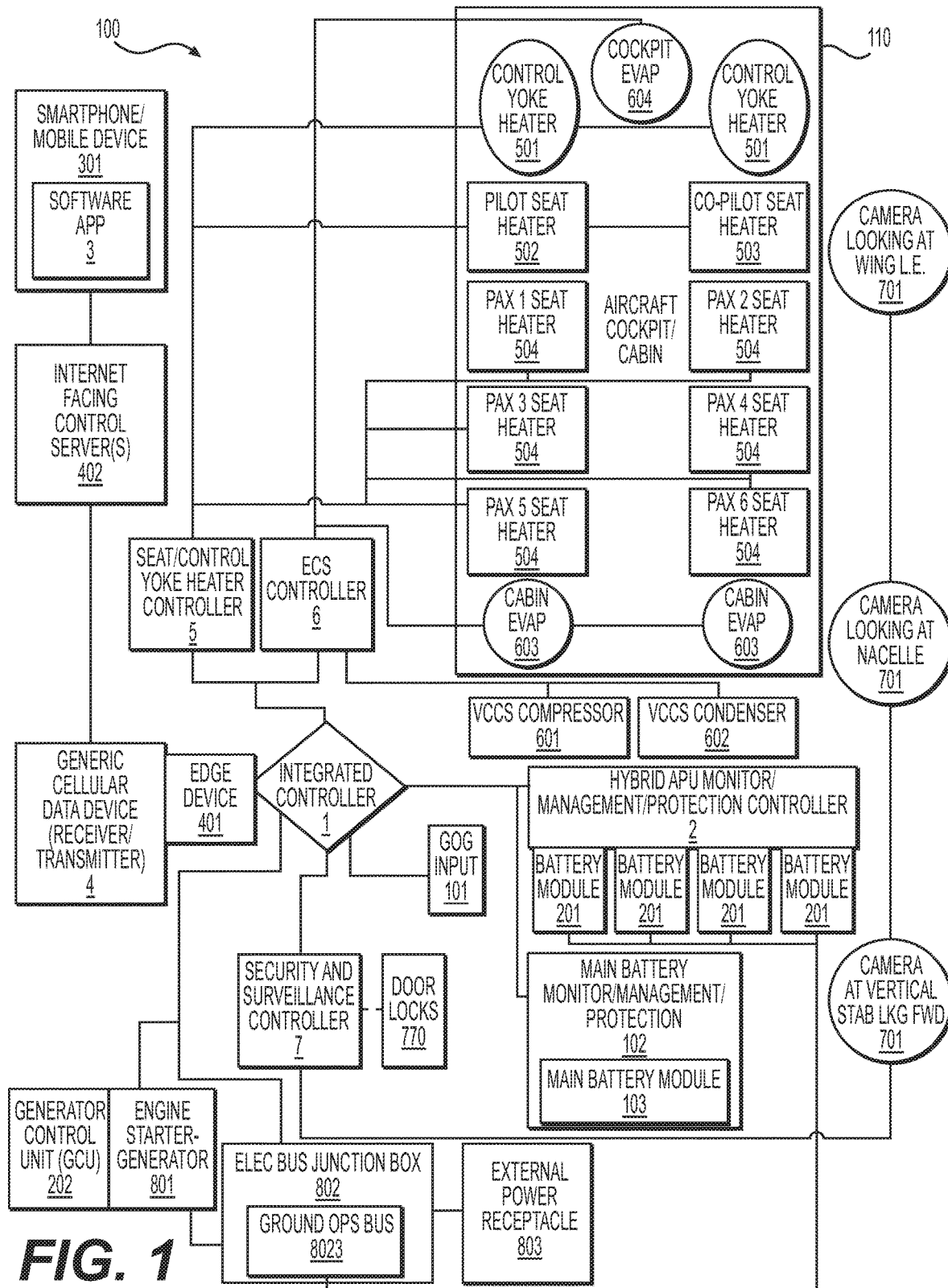
FIG. 1 is a block diagram representing an expedited preflight readiness system for aircraft, in an embodiment.

FIG. 1 is a block diagram representing an exemplary expedited preflight readiness system for aircraft 100. System 100 includes an integrated controller 1 configured to provide central control of system 100, and a hybrid auxiliary power unit (APU) 2 configured for powering system 100. System 100 may alternatively be powered by any power source such as ground power provided by an airport or by an electrical generator powered by aircraft engines; however, hybrid APU 2 provides advantages over alternative options as described below. A mobile device 301 (e.g., a smartphone) having an expedited preflight software application 3 may be used to access integrated controller 1. Mobile device 301 may be any remote user-interface device, without departing from the scope hereof, include a computer, laptop computer, tablet, smartphone, smart watch, etc. Exemplary features of software application 3 are described below in connection with FIGS. 7-12. System 100 enables the flight crew to begin preflight preparation of an aircraft before arriving at the airport. An aircraft equipped with system 100 enables the flight crew to remotely monitor and start multiple aircraft subsystems via mobile device 301 while the aircraft is unattended on the ground and without the use of cockpit presets. If monitored levels are low, the flight crew may contact FBO mechanics to replenish these levels before the flight crew's arrival.

Figure 2:
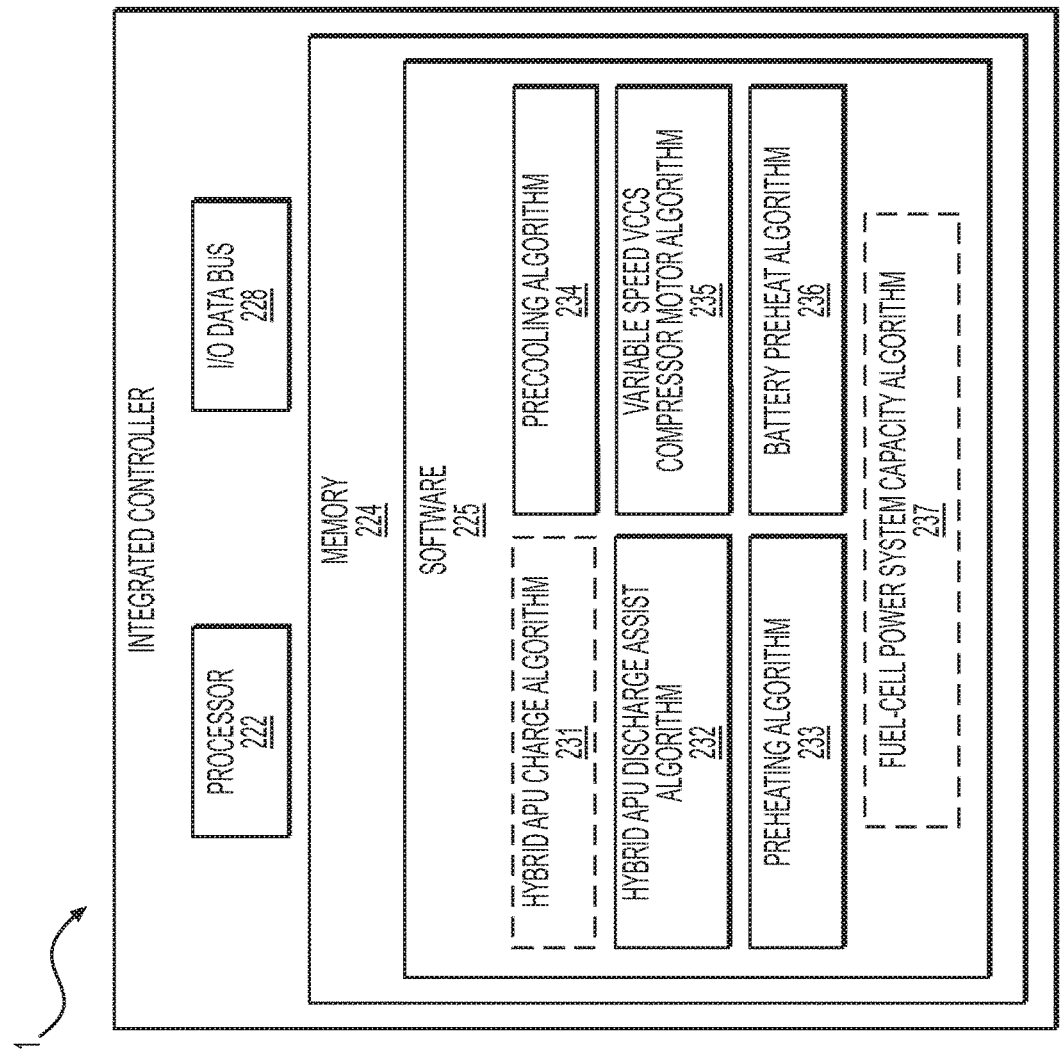
FIG. 2 is a block diagram of an integrated controller for the expedited preflight readiness system of FIG. 1.

FIG. 2 is a block diagram further illustrating integrated controller 1, FIG. 1. Integrated controller 1 may be one or more of a printed circuit board (PCB), a computer, a microcontroller, a microprocessor, or a programmable logic controller (PLC). Integrated controller 1 includes a memory 224, including a non-transitory medium for storing software 225, and a processor 222 for executing machine readable instructions of software 225. Memory 224 in some embodiments is a memory system that includes both transitory memory such as RAM and non-transitory memory such as, ROM, EEPROM, Flash-EEPROM, magnetic media including disk drives, and optical media. Software 225 may include look-up tables, formulas, and logical algorithms, such as algorithms 231-237, described below.

Returning to FIG. 1, integrated controller 1 further includes a multi-channel input/output (I/O) data bus 228 for communicating with a gear on ground (GOG) input 101, a main battery controller 102, hybrid APU 2, a seat/yoke heater controller 5, an environmental control subsystem (ECS) controller 6, and a security and surveillance controller 7. Note that some or all functions of seat/yoke heater controller 5, ECS controller 6, and a security and surveillance controller 7 may instead be performed by integrated controller 1. Integrated controller 1 is communicatively coupled via a wired and/or wireless communication device to a plurality of devices and subsystems, as described below in connection with FIG. 3. While awaiting commands from software application 3 of mobile device 301, integrated controller 1 may remain in a low power standby mode.

Mobile device 301 includes a memory (which is an example of memory 124, FIG. 1), including a non-transitory medium for storing software, and a processor for executing machine readable instructions of software. An interface enables a user to input instructions and view data, as further described below in connection with FIGS. 7-12. Mobile device 301 includes a transmitter/receiver for communicating with integrated controller 1 via an internet-facing control server 402, a generic cellular data device 4, and an gateway device 401, which are described below in connection with FIG. 3. Note that lines connecting blocks in FIG. 1 may represent communicative coupling for data/signal transmission and/or electrical coupling for providing electrical power, or both.

Hybrid APU 2 is an example of a power source that is communicatively coupled to integrated controller 1 and includes a plurality of battery modules 201 for storing and providing electrical power and circuitry configured for battery monitoring and protection. Battery modules 201 may include one or more of Nickel-Cadmium batteries, Lead-Acid batteries, and Lithium-Ion batteries, for example. Battery modules 201 may for example be located in aircraft side-racks in a parallel arrangement (e.g., a bank of battery modules). Battery modules 201 are configured to provide sufficient capacity to power integrated controller 1 and a communication subsystem (see e.g., FIG. 3), either continuously or intermittently, for an extended duration of aircraft inactivity. Status of battery modules 201 may be viewed remotely via mobile device 301, as described below in connection with FIG. 10. Intelligent algorithms 231-237, FIG. 2 may be used to efficiently manage energy usage by the APU, as further described below.

An advantage provided by using hybrid APU 2 is that aircraft subsystems may be operated when ground power is unavailable while still avoiding running of the aircraft engines. Running the aircraft engines or using a gas-turbine APU, each require ground personnel to be present and produce noise and air pollution that may be regulated by the airport. Hybrid APU 2 may be between fifteen and thirty decibels (dBa) quieter when running a vapor-cycle-cooling subsystem (VCCS) compared to when a gas turbine engine or APU is running the VCCS. Since hybrid APU 2 is not a combustion device, personnel do not need to be present for safe start-up or operation. Another advantage of hybrid APU 2 is that it provides non-essential power for responding to incoming status requests and commands from mobile device 301, which increases the connectivity of the aircraft. In other words, an aircraft equipped with hybrid APU 2 reliably has sufficient power for connecting to and operating aircraft subsystems remotely. Also, main aircraft batteries are required to be fully charged for take-off, so these are not available for preflight tasks without delaying departure.

The electrical junction box is the core of the aircraft electrical distribution subsystem and may receive electrical power from various electrical power sources (e.g., an engine starter-generator 801, an external power cart, and a main battery module 103) and distributes electrical power to other aircraft subsystems (e.g., Avionics, Flight Controls, Environmental Control Subsystem, Heater Control Subsystem, Security/Surveillance Subsystem, etc.). Hybrid APU 2 may be electrically coupled with the aircraft's subsystems through this electrical junction box 802. A ground operations bus 8023 inside the electrical junction box 802 may be used to electrically couple the Hybrid APU 2 to a select group of aircraft subsystems for unattended ground operations. Main battery module 103 may be electrically coupled to the electrical bus junction box 802. The main battery module 103 is monitored, managed, and protected via main battery controller 102. Status of main battery module 103 may be remotely viewed via mobile device 301, as described below in connection with FIG. 10. Hybrid APU 2 and main battery controller 102 are subsystem controllers that may be monitored via integrated controller 1. An external power receptacle 803 and engine starter generator 801 may also be electrically coupled to electrical bus junction box 802.

Hybrid APU 2 includes a plurality of battery modules 201 that may be discharged partially or completely during use. Engine starter-generator 801, under control of a generator control unit (GCU) 202, may be used to recharge battery modules 201 via ground operations bus 8023. Note that only one engine starter-generator 801 and one generator control unit 202 are shown in FIG. 1; however, more than one may be included in system 100 (e.g., one engine starter-generator 801 and one generator control unit 202 per engine). Generator control unit 202, which provides charge control function for hybrid APU 2, may be a variable voltage generator control unit. When the engine starter-generator 801 is on-line, battery modules 201 and main battery module 103 may become high-current demanding loads if they are also on-line. To prevent excessive current draw, the generator control unit 202 may gradually step up the charge voltage for Hybrid APU charge control function. The gradual step up in charge voltage may be controlled from the integrated controller 1 and/or the generator control unit 202. When the charge voltage is gradually stepped up, the impedance of battery modules 201 and main battery module 103 limits the charge current by the I=V/R relationship. The regulated voltage output from the engine starter-generator 801 may be gradually increased while maintaining a maximum current output that does not cause excessive heating or damage to the engine starter-generator 801.

Since the hybrid APU 2 may be connected to electrical bus junction box 802 through the ground operations bus 8023, stored electrical energy from the Hybrid APU 2 may be used to recharge the main battery 103.

The aircraft cockpit and cabin 110 include a control-yoke heater 501 and a pilot seat heater 502 for both the pilot and co-pilot (if applicable), as well as a plurality of passenger (PAX) seat heaters 504. In certain embodiments, the pilot/co-pilot control yoke may instead be an alternative control interface for operating aircraft, such as a control wheel or a side stick, in which case heater 501 is incorporated into the appropriate control interface. Seat/yoke heater controller 5 is used to control heating of control-yoke heater 501, pilot seat heater 502, co-pilot seat heater 503, and passenger seat heaters 504. Seat/yoke heater controller 5 may include a PCB, a microcontroller, a microprocessor, or a PLC, for example. Additional electric heaters (not shown) may also be controlled by heater controller 5, such as heaters for cockpit/cabin air preheating, windshield-defrost, engine oil preheating, battery preheating, and wing leading-edge anti-icing/deicing, for example. Conventional aircraft typically use hot bleed air from an engine or a gas-turbine APU to provide cockpit/cabin air heating, requiring ground personnel to be present when combustion devices are in use. Heaters 501, 502, and 504, as well as additional electric heaters (not shown), may be remotely controlled via mobile device 301, as described below in connection with FIG. 7.

Environmental control subsystem (ECS) controller 6 includes a controller for controlling air conditioning to the aircraft cockpit and cabin 110. ECS controller 6 may be used to control the VCCS, including a refrigerant compressor 601, a refrigerant condenser 602, at least one cabin evaporator 603, and a cockpit evaporator 604. ECS controller 6 may include a PCB, a microcontroller, a microprocessor, or a PLC, for example. Alternatively, ECS controller 6 may be incorporated within integrated controller 1. Cockpit and cabin temperature may be remotely controlled via mobile device 301, as described below in connection with FIG. 8. Cabin and cockpit evaporators 603, 604 may be independently switched on or off, either from cockpit/cabin switches, or remotely via mobile device 301.

In an embodiment, compressor 601 includes an electrically-powered, variable-speed compressor motor. Light jet aircraft, turboprop aircraft, and rotorcraft typically use electrical power to operate the VCCS, whereas medium to large jet aircraft operate an air cycle cooling system (ACCS) based on pneumatic power. In general, batteries of various chemistries have varying amounts of internal impedance and energy density. To maximize energy density while limiting battery weight, Lithium-ion cells having a lower discharge rate may be used. However, VCCS compressor motors typically operate in only one of two states: off, or on at full speed. And, VCCS compressors are typically sized for the maximum expected heat load at the high end of the temperature operating range. Consequently, when using the electrically-powered VCCS, a high current demand may be placed on the power source (e.g, hybrid APU 2). Using a variable-speed VCCS compressor motor provides at least the following four advantages:

First, if low discharge rate Lithium-ion cells or low state-of-charge (SOC) battery modules 201 are used, the speed of the variable-speed VCCS compressor may be reduced such that battery modules 201 continue to provide a sufficient electrical output without exceeding any current limits or prematurely falling below a discharge-voltage threshold.

Second, the speed of the variable-speed VCCS compressor may be reduced, thereby reducing wasted energy for appropriate situations, such as warm but not hot days, where full speed is not required.

Third, continuous operation of the variable-speed VCCS compressor at a low speed (e.g., lower than the maximum speed) provides a consistent and quieter environmental noise signature by avoiding intermittent high-current discharge surges from the batteries.

Fourth, continuous operation of the variable-speed VCCS compressor at different speeds enables easier estimation of energy usage and easier determination of a precooling profile (e.g., based on a constant cooling rate as opposed to a constant compressor speed with intermittent operation or varying duty cycle). A precooling algorithm 234, described below, may include compressor motor speed as a variable, which may be determined via a look-up table or formula, to determine the precooling profile.

Figure 12:
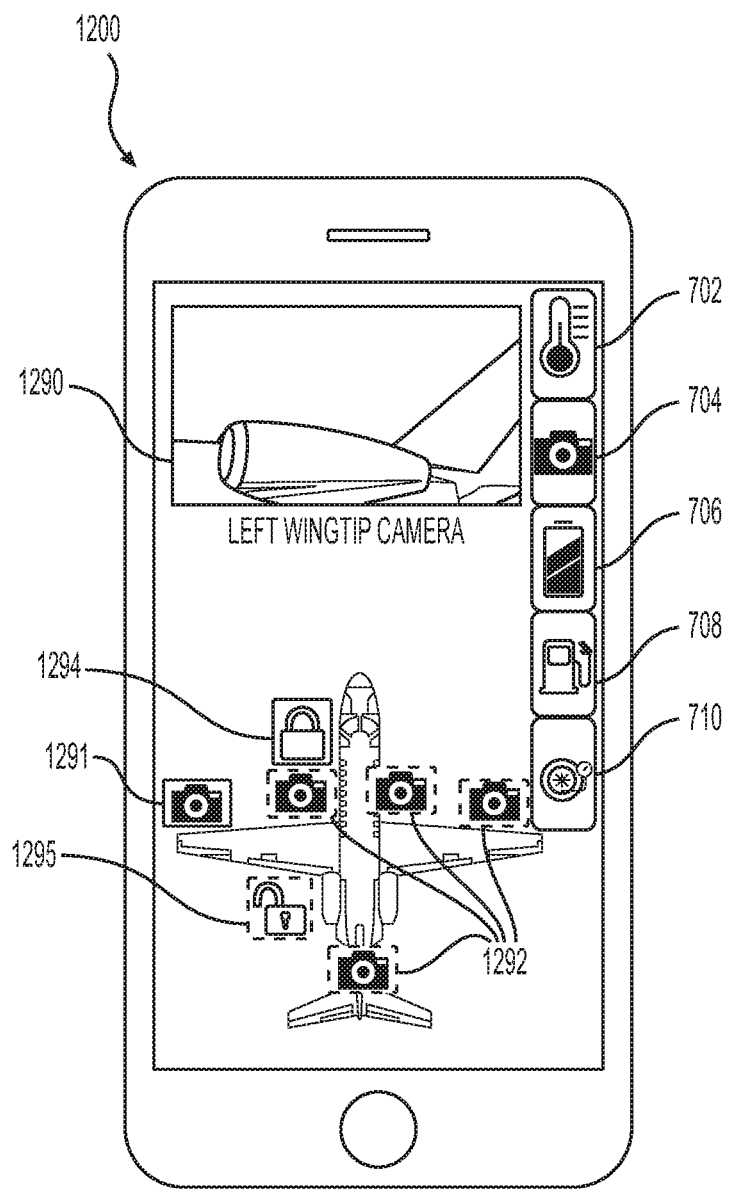
FIG. 12 shows a security and surveillance page of the software application of FIG. 1, in an embodiment.

Returning to FIG. 1., security and surveillance controller 7 provides control over door locks 770 and surveillance cameras 701, which may include a plurality of cameras such as a camera located on the vertical stabilizer looking forward, a camera located on a left and right wingtip looking respectively at a left and right nacelle, and a camera looking at a wing leading edge (see e.g., camera indicators 1292, FIG. 12). Live views from the cameras may be displayed remotely via mobile device 301 (see e.g., camera view 1290, FIG. 12). Door locks 770 may include door lock actuators and door lock position monitors, for example, which may be monitored and controlled via mobile device 301 (see e.g., door lock indicators 1294, FIG. 12). Door locks 770 and cameras 701 enable a user via mobile device 301 to remotely unlock the aircraft for allowing entry of ground personnel and remotely view activity at the aircraft, respectively.

System 100 may further include additional subsystems and monitoring devices not depicted in FIG. 1. For example, an avionics suite may be powered while the aircraft is on the ground for performing preflight checks, a fuel system monitor may include a fuel quantity indicator, and an engine system monitor may include several sensors such as an engine-oil-quantity indicator, all of which may be communicatively coupled with integrated controller 1. In certain embodiments, mobile device 301 may be used to operate hybrid APU 2 manually without integrated controller 1, in which case any equipment that is manually turned on may be powered via hybrid APU 2.

Using algorithms 231-237, FIG. 2, integrated controller 1 may monitor a state of electrical charge, or more commonly referred to as state-of-charge (SOC), from its available power sources and centrally coordinate the initiation and operation of selected aircraft subsystems to minimize energy waste, while meeting preflight readiness requirements. In addition to being used for preflight readiness, monitored aircraft subsystem data may be used for trend monitoring and predictive servicing.

A hybrid APU charge algorithm 231 evaluates the SOC of hybrid APU 2 and determines the charge voltage necessary for timely charging of battery modules 201 without excessive loading on engine starter-generator 801. Algorithm 231 is optionally located within integrated controller 1 but may instead be part of generator control unit (GCU) 202. Algorithm 231 is used to regulate output voltage during charging of battery module 201 to prevent excessive current and temperature increase by engine starter-generator 801 on the ground or in-flight.

A hybrid APU discharge assist algorithm 232 may be used continuously during ground and flight operations. During ground operations, algorithm 232 determines when main battery module 103 is depleted and instructs hybrid APU 2 to recharge main battery module 103, alleviating the need for recharge via a ground power cart or engine-starter generator 801 (which would require running the aircraft's engines). During flight when the flight crew instructs hybrid APU 2 to electrically connect with electrical bus junction box 802, hybrid APU 2 may provide electrical current to reduce engine starter-generator 801 load, and thus engine load, during critical flight stages such as take-off. During an in-flight emergency or unexpected loss of an electrical power source, hybrid APU 2 may provide additional emergency electrical power.

A preheating algorithm 233 is used during cold weather to preheat the cabin and/or cockpit. Preheating algorithm 233 may be activated by the flight crew via a command from mobile device 301 to integrated controller 1 with one or more target temperatures and a completion time, as further described below in connection with FIG. 8. Individual target temperatures may be selected for control yoke heaters 501, pilot seat heaters 502, and passenger seat heaters 504, as further described below in connection with FIG. 7. A windshield defrost completion time and temperature may also be selected. Preheating algorithm 233 evaluates the available charge capacity of hybrid APU 2, the outside air temperature (OAT), and the cockpit/cabin temperature against a look-up table or formula to determine the amount of time, operating profile of the heater systems, and the time needed for optimal just-in-time achievement of the preheating target temperature and time. In an embodiment, electric heaters provide only a fraction of the heat needed to fully heat the cockpit/cabin for reducing the cold weather experience, albeit without complete warmth. Preheating seats and the control yoke provides warmth even if the air remains cold.

A precooling algorithm 234 is used during hot weather to precool the cabin and/or cockpit. Precooling algorithm 234 may be activated by the flight crew via a command from mobile device 301 to integrated controller 1 with a target temperature and completion time, as further described below in connection with FIG. 7. Precooling algorithm 234 evaluates the available charge capacity of hybrid APU 2, the OAT, and the cockpit/cabin temperature against a look-up table or formula to determine the amount of time, operating profile of the air conditioning system (e.g., ECS controller 6), and the time needed for optimal just-in-time achievement of the target temperature and completion time. Precooling algorithm 234 avoids achieving the target temperature substantially before the target completion time, which may cause excess energy loss from continuously running the air conditioner to compensate for heat load into the cabin.

A variable-speed VCCS compressor motor algorithm 235 uses a VCCS motor of compressor 601 to determine an operating profile for optimizing energy use, which reduces energy waste by running the compressor motor at full speed when only a minimal heat load exists.

A battery-preheat algorithm 236 controls power-source discharge to preheat main battery module 103 and/or battery modules 201 until a predetermined temperature is achieved. Algorithm 236 may control heaters external to the battery or heaters internal to the battery.

For algorithms directed to a preconditioning operation (e.g., preheating 233, precooling 234, variable-speed VCCS compressor motor 235, and battery preheat 236), energy optimization includes determining the times for the appropriate subsystem to start-up, operate, and shutdown. In a scenario where insufficient energy is available for achieving the target times, the flight crew is notified via mobile device 301.

An optional fuel-cell power capacity algorithm 237 evaluates an extent of continuous operation available from a fuel cell power system for aircraft that are optionally equipped with a fuel cell power system (not shown). For example, for a fuel cell power system having a source of stored hydrogen, algorithm 237 evaluates hydrogen availability by considering parameters such as storage pressure, stored gas temperature, and gas usage rate, to determine available energy for unattended ground operations.

Figure 3:
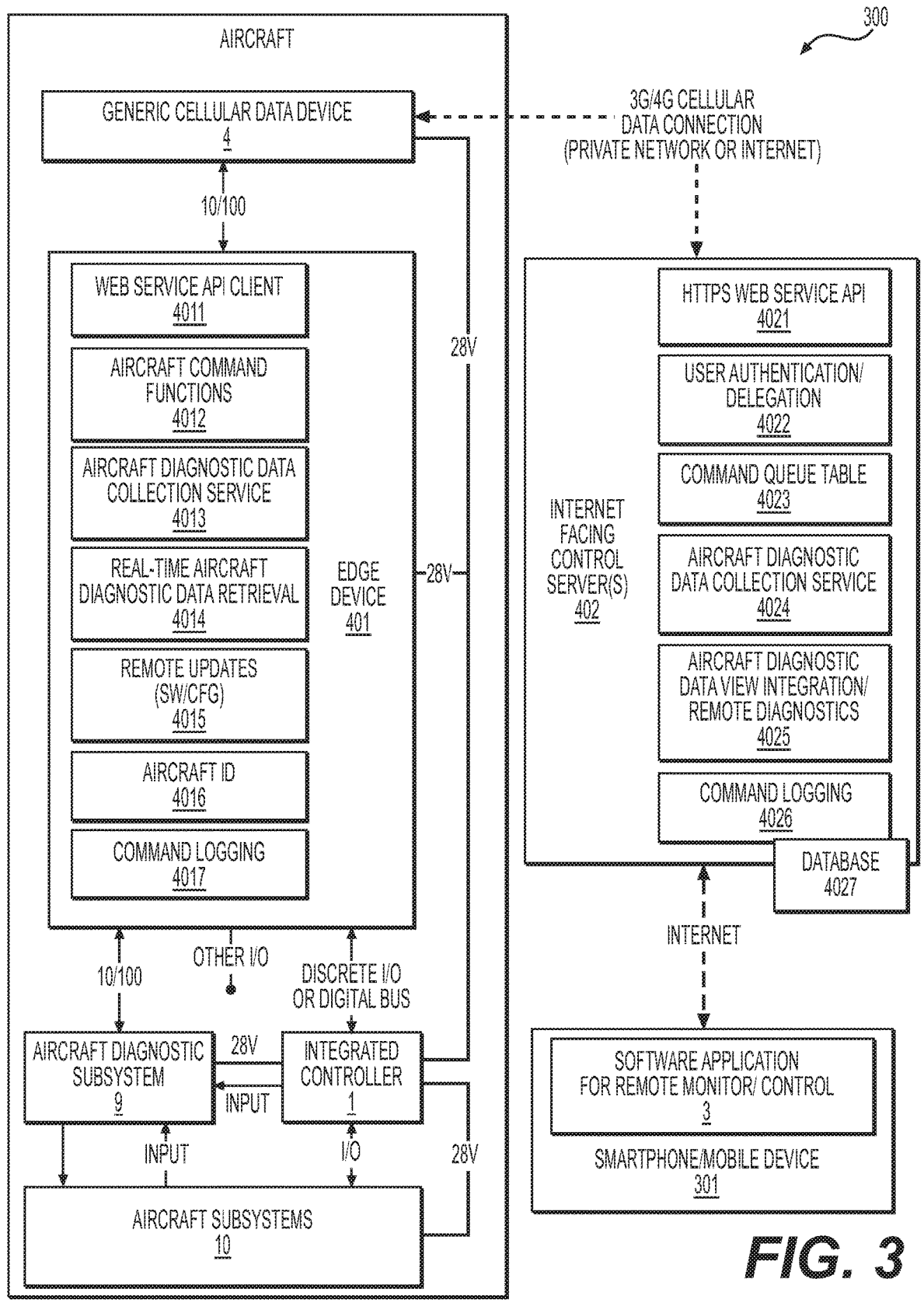
FIG. 3 is a block diagram showing a communication subsystem for communicative coupling between a mobile device and aircraft subsystems for the expedited preflight readiness system of FIG. 1.

FIG. 3 is a block diagram showing a communication subsystem 300 for communicative coupling between mobile device 301 and aircraft subsystems 10 via control server 402, generic cellular data device 4, gateway device 401, and integrated controller 1. Communicative coupling may be by one of a wired and/or wireless communication device. Aircraft subsystems 10 include main battery 102, hybrid APU 2, seat/yoke heater controller 5, ECS controller 6, security and surveillance controller 7, and electrical bus controller 8, for example.

Internet-facing control server 402 may be located remotely (e.g., not at the airport and not with mobile device 301). Internet transmission may use any combination of cellular, satellite, wireless fidelity (Wi-Fi), Ethernet, or similar communication networks. A secure web service application program interface (API) 4021 handles communication over the Internet. In certain embodiments, the web service interface on 402 control server may implement standardized protocols such as Advanced Message Queuing Protocol (AMQP) or Message Queuing Telemetry Transport (MQTT). For example, when a command is sent from mobile device 301, the command is routed through internet-facing control server 402 via web service API 4021. A user of mobile device 301 may be authenticated via a user authentication/delegation protocol 4022. The 4022 protocol may make use of standard authentication and authorization methods such as SSL/TLS, OAuth, LDAP, or Active Directory. Once the user is authenticated, the command sent from mobile device 301 is added to a command queue table 4023, which is sent to the aircraft via generic cellular data device 4 to gateway device 401. The main function of generic cellular data device 4 is to transmit and receive data to/from gateway device 401 through an Ethernet or similar data bus. The control server 402 may also implement a database to store transactional history for the various data to and from the aircraft. Server 402 stores data from aircraft subsystems 10, including in an aircraft diagnostic data collection service 4024 for collecting subsystem data, an aircraft diagnostic data view integration 4025 for providing data to mobile device 301 in a viewable format, and command logging function 4026 for providing a log of entered commands.

Gateway device 401 is a device that serves as an intermediary between integrated controller 1 and the generic cellular data device 4 and provides unified access to aircraft subsystems for all external query and command operations. In certain embodiments, gateway device 401 is a router or integrated access device (IAD) that contains a plurality of input/output interfaces in order to interface with the integrated controller 1, diagnostic subsystem 9, or other aircraft systems 10. In some embodiments, gateway device 401 includes a web service API client 4011 for handling Internet communication. Gateway device 401 provides operations that may be performed by the mobile device 301 via relay through control server 402. Gateway device 401 may automatically and periodically attempt to establish a connection to control server 402 in order to receive commands or transmit system status. Gateway device 401 may utilize API client 4011 in order to establish a secure data communication path to control server 402. An aircraft command function 4012 determines whether a command is a data query or a command to activate/deactivate a specific function of aircraft subsystems 10. If the command is a data query it gets relayed to an aircraft diagnostic subsystem 9; otherwise, the command gets relayed to integrated controller 1. Following execution of an activation/deactivation command, integrated controller 1 returns a confirmation to mobile device 301 by way of traversing gateway device 401 and control server 402 via an Internet connection. Data query results are returned to control server 402 through the same path and made available for display on mobile device 301.

An aircraft diagnostic data collection service 4013 regularly collects and stores information from sensors monitoring subsystems throughout the aircraft. A real-time aircraft diagnostic data retrieval service 4014 may retrieve real-time data from data collection service 4013 upon request. A remote updates function 4015 provides automatic software updates of the latest software configuration. An aircraft ID 4016 provides identification information for the aircraft such as tail number or aircraft make, model, and serial number. A command logging function 4017 provides a log of entered commands.

Aircraft diagnostic subsystem 9, which is communicatively coupled to gateway device 401 and aircraft subsystems 10, collects data reported by aircraft subsystems 10. Example sensors include tire pressure sensors, engine oil level indicators, battery SOC sensors, and temperature sensing devices such as thermocouples and resistance temperature detectors. In an embodiment, aircraft diagnostic subsystem 9 sends interrogation requests for specific data parameters to a specified aircraft subsystem on demand. In an alternative embodiment, aircraft diagnostic subsystem 9 sends interrogation requests for specific data parameters to all sub-systems in real-time or on demand. In yet another embodiment, aircraft diagnostic subsystem 9 does not send interrogation requests but may receive any data sent to it.

In operation, flight crew may begin preflight preparation by remotely scheduling aircraft subsystems (e.g., using mobile device 301) to be activated and ready by a specific clock time, without requiring cockpit presets onboard the aircraft. For example, ECS controller 6 may be turned on for cockpit/cabin precooling, seat heaters 502, 504 may be turned on for preheating seats, and battery heaters may be turned on for heating battery modules 201 using pages of mobile device 301, FIG. 3. Preflight operations may be powered using either an unlimited power source (e.g., a ground power cart plugged into the aircraft or a fuel-cell power system operating on aircraft jet fuel) or a limited power source (e.g., one or more main batteries, an extended capacity auxiliary battery such as hybrid APU 2, or a fuel cell power system operating on hydrogen stored in the aircraft).

After the aircraft has landed and been shut down, an unattended ground operations mode ensues. Battery modules 201 remain active to maintain integrated controller 1, gateway device 401, and generic cellular data device 4 powered. These devices may be continuously active in a normal-power mode, continuously active in a low-power mode, or intermittently active to reduce energy usage and occasionally determine if normal-power mode should be resumed. Power modes may be varied depending on the SOC of battery modules 201.

Figure 4:
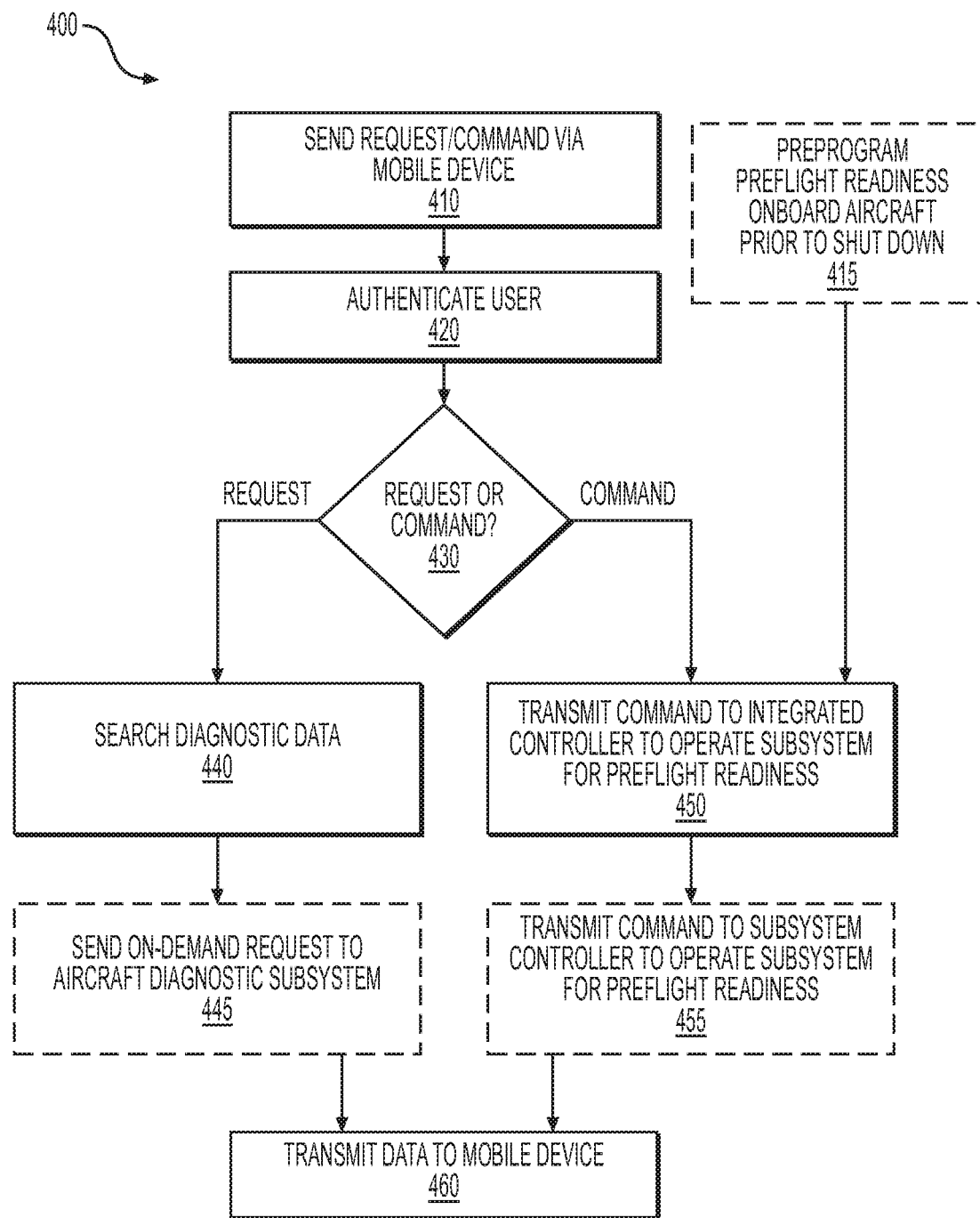
FIG. 4 is a flow diagram showing an expedited preflight readiness method, in an embodiment.

FIG. 4 is a flow diagram showing an exemplary expedited preflight readiness method 400. Method 400 may be performed using system 100, FIG. 1, for example.

In a step 410, a signal is sent via a mobile device. The signal may include a request for data or a command to turn on the aircraft, or to turn on or operate a subsystem or component of system 100. In an example of step 410, mobile device 301, FIG. 1 sends a status/data request or a command via the appropriate cellular/satellite/wifi/Ethernet communication protocol to internet-facing control server 402 via secure web service API 4021, FIG. 3. Data or status for a particular parameter may be requested by the user via software application 3 on mobile device 301.

In another example of step 410, the signal sent via mobile device 301 is preprogrammed to automatically send. For example, mobile device 301 may allow a user to preprogram sending a command based on a predetermined time or a predetermined location. For example, the predetermined time may be a time of day (e.g., a clock alarm) or it may be a predetermined amount of time (e.g., one hour) prior to a scheduled departure time for a flight or prior to a scheduled arrival time for the crew. Alternatively, a geofence (e.g., a virtual GPS boundary) may be used to determine when mobile device 301 is within a certain distance of the airport such that the aircraft automatically begins preflight readiness routines when the user of mobile device 301 is approaching the airport. The preprogrammed commands may be used to turn on the aircraft including one or more subsystems of the aircraft and to initiate programs or protocols of the one or more subsystems (e.g., for cabin preconditioning).

In an optional step 415, preflight readiness instructions are preprogrammed onboard the aircraft prior to shut down. In an example of step 415, integrated controller 1 automatically operates subsystems for preflight readiness at a prescheduled time without receiving a command from a mobile device.

In a step 420, the user is authenticated. In an example of step 420, control server 402 authenticates the user of mobile device 301 via user authentication/delegation protocol 4022, FIG. 3. Authentication may require that mobile device 301 is a previously authorized device and/or that the user provide credentials, such as a user name and password for example.

A step 430 is a decision. If in step 430, control server 402 determines that a request for status or data is being sought, method 400 proceeds with step 440. Otherwise, if server 402 determines that a command is being sent to a subsystem, method 400 proceeds with step 450. In an example of step 430, aircraft command function 4012, FIG. 3 determines whether a command is a data query or a command to activate/deactivate a specific function of a subsystem.

In a step 440, diagnostic data is searched based on a request from step 430. In an example of step 440, aircraft diagnostic data collection service 4024 on control server 402 searches diagnostic data stored in database 4027. The diagnostic data stored in database 4027 is data received from aircraft diagnostic data collection service 4013 and real-time aircraft diagnostic data retrieval 4014. This data is a copy of data originally collected and stored in aircraft diagnostic subsystem 9, which is onboard the aircraft. The aircraft diagnostic database 4027 may be stored in server 402 (e.g., in the cloud).

In certain embodiments, integrated controller 1 may be further integrated with the aircraft diagnostic subsystem 9 into a single device. However, the aircraft diagnostic subsystem 9 may be configured as the only device configured to continuously receive all data parameters from a plurality of aircraft subsystems and the integrated controller 1, in which case the requested parameter is retrieved in step 445 from aircraft diagnostic subsystem 9. The integrated controller 1 receives aircraft subsystem data parameters necessary for the control of specific aircraft subsystems, but does not store the data parameters in memory.

In optional step 445, an on-demand interrogation request is sent to an aircraft diagnostic subsystem. In an example of step 445, a request to determine how much time is needed to precool the cabin to a target temperature is sent to Integrated Controller 1

In a step 450, a command is transmitted to the integrated controller to operate a subsystem for preflight readiness. In an example of step 450, control server 402 transmits a command from step 430 to integrated controller 1 for operating security and surveillance controller 7. If integrated controller 1 does not provide direct control over an aircraft subsystem, and instead the subsystem includes its own controller, method 400 proceeds with optional step 455.

In an optional step 455, the command is transmitted to a subsystem controller. In an example of step 455, integrated controller 1 transmits the command to ECS controller 6.

In a step 460, data are transmitted to the mobile device. In an example of step 460, integrated controller 1 transmits cooling status data based on monitored ECS parameters, transmits the data to control server 402 via gateway device 401, which transmits the data via the appropriate cellular/satellite/wifi/Ethernet communication protocol to mobile device 301 for display to the user. In this way, the user may remotely monitor precooling progress, for example. In another embodiment, the aircraft diagnostic subsystem 9 may obtain cooling status data from integrated controller 1 and transmit this data to server 402 via gateway device 401.

In another example of step 460, a ready/not-ready alert or communication is transmitted to the mobile device. This allows the user to be notified when a preflight-readiness protocol has been completed, or if some problem exists that has prevented the preflight-readiness protocol from being completed. In the case of a not-ready alert, the mobile device 301 may present a notify-FBO option to the user for notifying the FBO.

Figure 5:
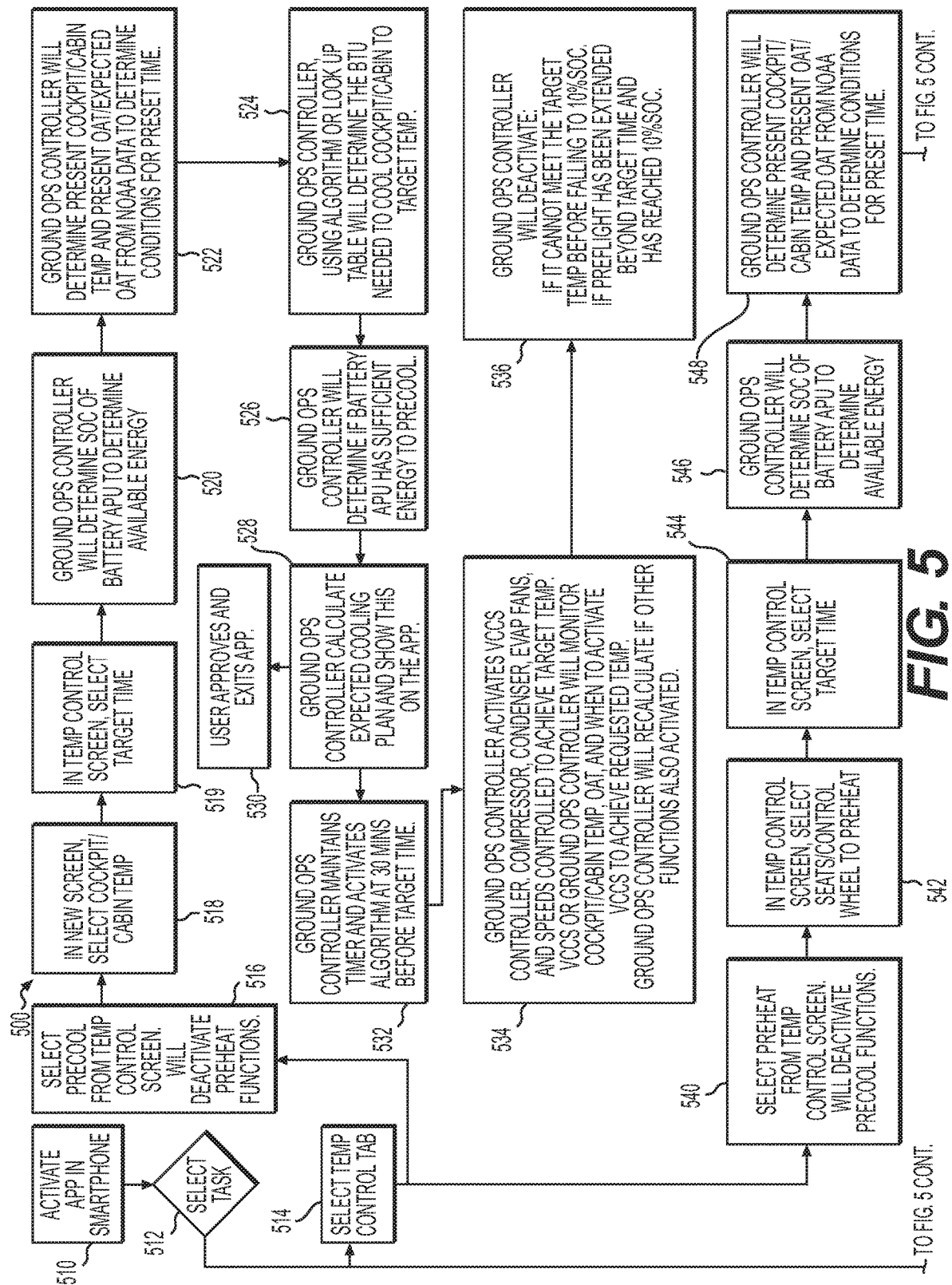
FIG. 5 is a flow diagram showing an expedited preflight readiness method for preconditioning an aircraft cockpit and cabin, in an embodiment.
Figure 5:
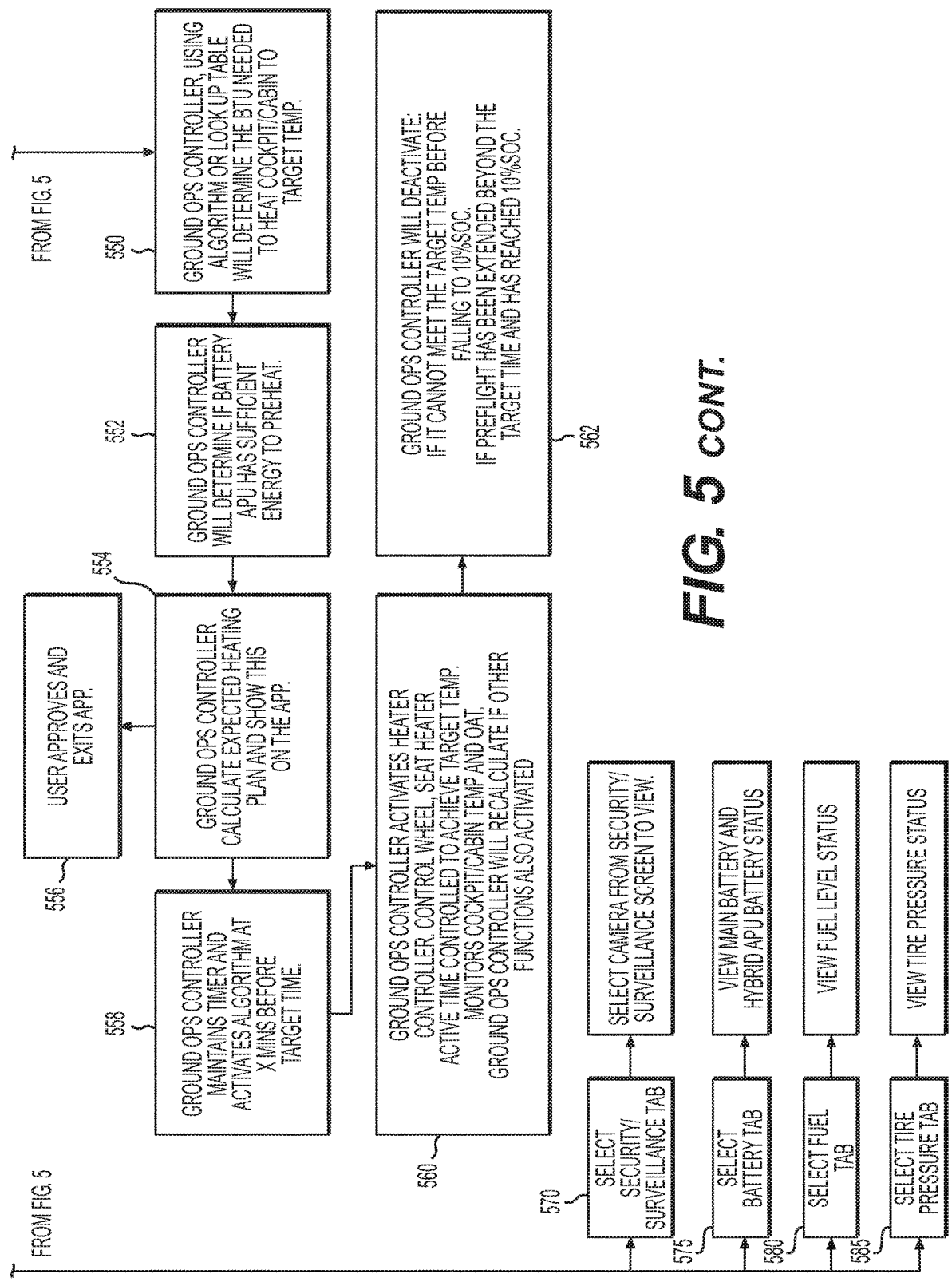

FIG. 5 is a flow diagram showing an exemplary expedited preflight readiness method 500 for preconditioning the aircraft cockpit and cabin. Preconditioning may include precooling or preheating the aircraft cockpit and cabin to a target temperature.

In a step 510, the user activates expedited preflight software application 3 of mobile device 301.

In a step 512, the user selects a task list from software application 3. The task list may include lists of words or icons.

Figure 7:
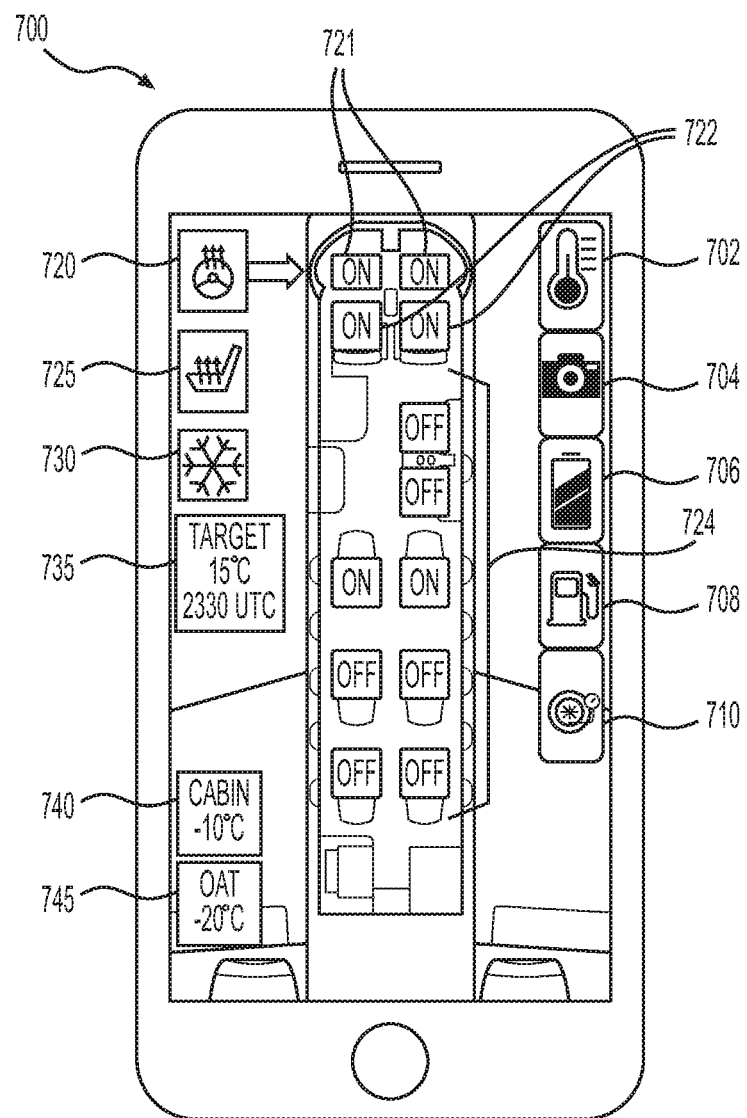
FIG. 7 shows a preconditioning page of the software application of FIG. 1 for expedited preflight readiness for aircraft, in an embodiment.

In a step 514, the user selects a temperature control page from the task list. In an example of step 514, temperature control button 725, FIG. 7 is selected using mobile device 301. If in step 514 the user selects a precool option, method 500 proceeds with step 516. Otherwise, if the user selects a preheat option, method 500 proceeds to step 540.

In a step 516, the user selects the precool option from the temperature control page. By selecting the precool option, preheat functions are automatically deactivated.

Figure 8:
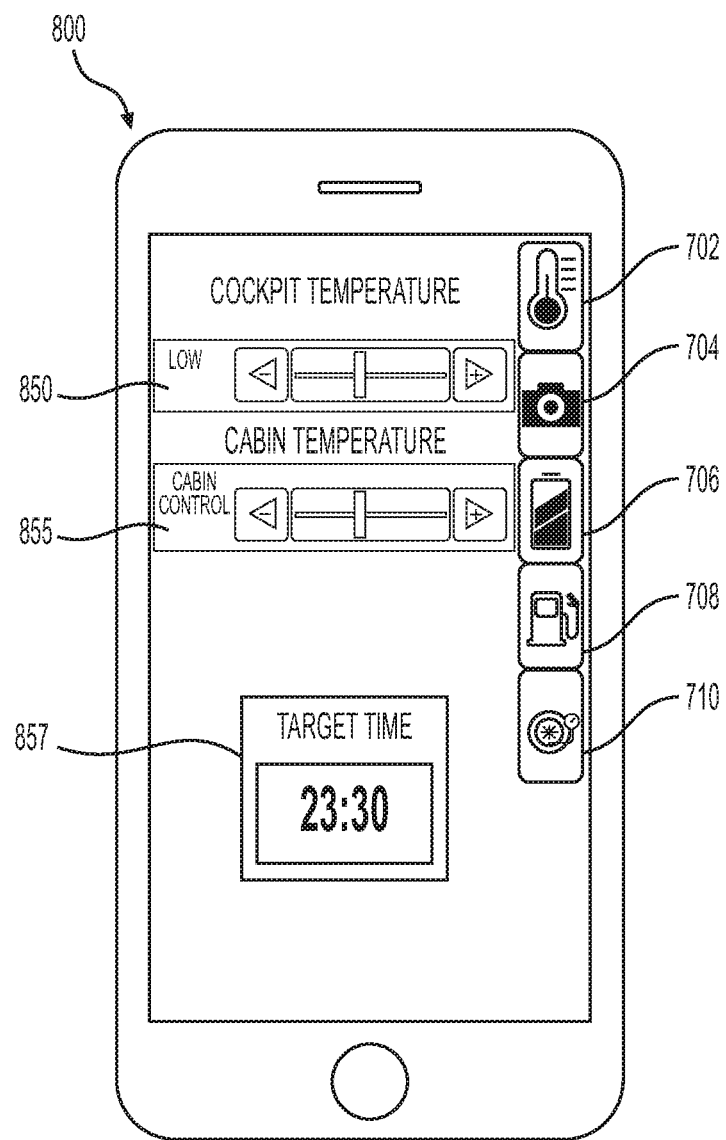
FIG. 8 shows a temperature control page of the software application of FIG. 1, in an embodiment.

In a step 518, the user selects a cockpit/cabin target temperature in a new screen. In an example of step 518, using a temperature control page 800, a cockpit temperature slider 850, FIG. 8 is used to select a cockpit target temperature and a cabin temperature slider 855, FIG. 8 is used to select a cabin target temperature.

In a step 519, the user selects a target time to achieve the target temperature. In an example of step 544, mobile device 301 is used to select a target time for preheating.

In a step 520, ground-operations integrated controller 1 determines a SOC of hybrid APU 2 for estimating available energy.

In a step 522, integrated controller 1 determines a current cockpit/cabin temperature, a current outside air temperature (OAT), and an expected OAT for the target time from National Oceanic and Atmospheric Administration (NOAA) data for example, and determines the current and expected difference between cockpit/cabin temperature and OAT.

In a step 524, integrated controller 1 determines the energy (e.g., amount of British thermal units (BTUs)) needed to cool the cockpit/cabin to the target temperature based on a lookup table or formula.

In a step 526, integrated controller 1 determines if hybrid APU 2 has sufficient energy to accomplish the precool target temperature in the target time.

In a step 528, integrated controller 1 calculates an expected cooling plan and displays the cooling plan on software application 3 of mobile device 301. If insufficient time exists to meet the target temperature within the target time, integrated controller 1 may determine the coolest possible temperature achievable by the target time for display on mobile device 301.

In a step 530, software application 3 waits for the user to approve the cooling plan. Once the user approves the cooling plan, the user may exit from software application 3.

In a step 532, integrated controller 1 maintains a timer and activates the cooling plan at a predetermined amount of time prior to the target time. The predetermined amount of time may depend upon the current cabin/cockpit temperature, the current OAT, the expected OAT, and the available energy of hybrid APU 2, among other things. For example, integrated controller 1 may activate the cooling plan thirty minutes prior to the target time.

In a step 534, integrated controller 1 activates ECS controller 6, which operates VCCS compressor 601, VCCS condenser 602, cabin evaporators 603, and cockpit evaporator 604 to cool the cockpit/cabin air temperature. The controller of ECS controller 6 determines the duty cycle of controllable parameters, such as percentage of time active, time duration, fan speed/motor speed, and louver/orifice size of each component. While cooling, ECS controller 6 monitors the temperature and the activation of any subsystems that may increase heat load. If necessary, ECS controller 6 may dynamically adjust component performance to maintain the planned precooling profile to achieve the target temperature by the targeted time.

In a step 536, integrated controller 1 deactivates, thereby completing precooling of the cockpit/cabin. Integrated controller 1 may prematurely deactivate cooling if, for example, the SOC of battery modules 201 falls below 10%.

In a step 540, the user selects the preheat option from the temperature control page. In an example of step 540, heater button 720, FIG. 7 is selected. By selecting the preheat option, precool functions are automatically deactivated.

In a step 542, the user selects a preheat target temperature. In an example of step 542, using a temperature control page 800, a cockpit temperature slider 850, FIG. 8 is used to select a cockpit target temperature and a cabin temperature slider 855, FIG. 8 is used to select a cabin target temperature. In another example of step 542, using a preconditioning page 700, pilot and/or co-pilot control-yoke heaters 501, FIG. 1 may be turned on using control-yoke heater buttons 721, FIG. 7; pilot seat heater 502, FIG. 1 and/or co-pilot seat heater 503, FIG. 1 may be turned on using pilot and/or co-pilot seat heater buttons 722, FIG. 7, respectively; and, passenger seat heaters 504, FIG. 1 may be individually turned on using passenger seat heater buttons 724, FIG. 7.

In a step 544, the user selects a target time for preheating. In an example of step 544, mobile device 301 is used to select a target time of 23:30 coordinated universal time (UTC) for preheating to 15° C.

In a step 546, integrated controller 1 determines the SOC of hybrid APU 2 for estimating available energy.

In a step 548, determines a current cockpit/cabin temperature, a current OAT, and an expected OAT for the target time from NOAA data for example, and determines the current and expected difference between cockpit/cabin temperature and OAT.

In a step 550, integrated controller 1 determines the energy (e.g., an amount of BTUs) needed to heat the cockpit/cabin to the target temperature based on a lookup table or formula.

In a step 552, integrated controller 1 determines if hybrid APU 2 has sufficient energy to accomplish the preheat target temperature in the target time.

In a step 554, integrated controller 1 calculates an expected heating plan and displays the heating plan on software application 3 of mobile device 301. If insufficient time exists to meet the target temperature within the target time, integrated controller 1 may determine the warmest possible temperature achievable by the target time for display on mobile device 301.

In a step 556, software application 3 waits for the user to approve the heating plan. Once the user approves the heating plan, the user may exit from software application 3.

In a step 558, integrated controller 1 maintains a timer and activates the heating plan a predetermined amount of time prior to the target time. The predetermined amount of time may depend upon the current cabin/cockpit temperature, the current OAT, the expected OAT, and the available energy of hybrid APU 2, among other things. For example, integrated controller 1 may activate the heating plan X minutes prior to the target time, where X is a non-negative integer.

In a step 560, integrated controller 1 activates ECS controller 6, which operates control yoke heaters 501, pilot seat heaters 502, and passenger seat heaters 504, FIG. 1. While heating, ECS controller 6 monitors the temperature and the activation of any subsystems that may alter the heat load. If necessary, ECS controller 6 may dynamically adjust component performance to maintain the planned preheating profile to achieve the target temperature by the target time.

In a step 562, integrated controller 1 deactivates all heaters, thereby completing preheating of the cockpit/cabin. Integrated controller 1 may prematurely deactivate heating if, for example, the SOC of battery modules 201 falls below 10%.

Other features of method 500 include a security and surveillance 570, a battery status 575, a fuel status 580, and a tire pressure 585. Using mobile device 301, security and surveillance 570 may be selected from a security and surveillance button 704 to provide a selection of views from security cameras (see e.g., FIG. 12); battery status 575 may be selected from a battery button 706 to provide status information for main battery 103 and battery modules 201 (see e.g., FIG. 10); fuel status 580 may be selected from a fuel button 708 to provide fuel-level status (see e.g., FIG. 11); and, tire pressure 585 may be selected from a tire pressure button 710 (see e.g., FIG. 9).

Figure 6:
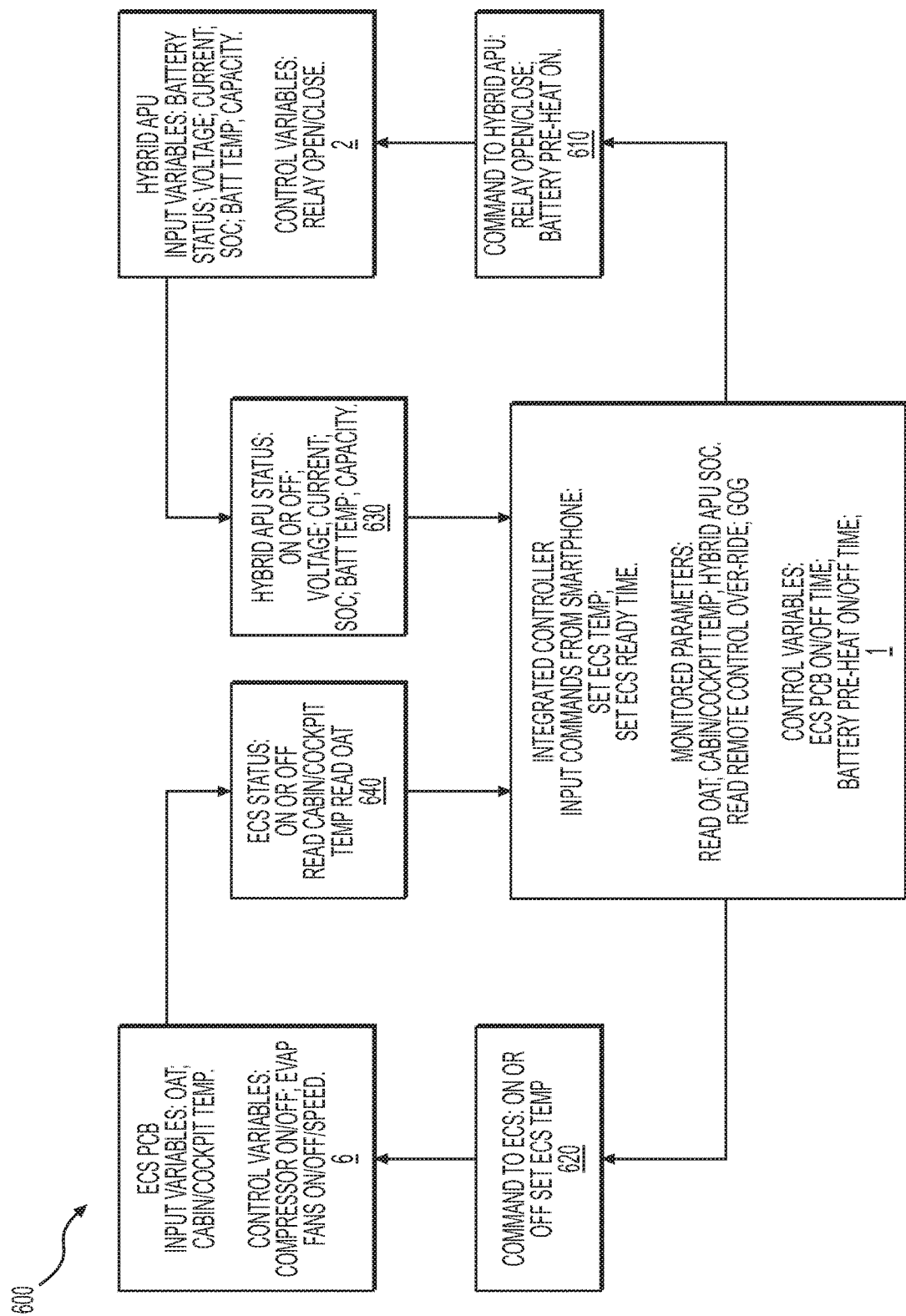
FIG. 6 is one embodiment of a control diagram for the expedited preflight readiness system of FIG. 1.

FIG. 6 is an exemplary control diagram 600 for expedited preflight readiness system 100. Specifically, control diagram 600 shows input and control variables of integrated controller 1, ECS controller 6, and hybrid APU 2, and commands between them for precooling the cockpit/cabin. Input commands from mobile device 3 for integrated controller 1 include setting the targeted temperature and targeted time for preheating or precooling the cabin/cockpit. Parameters that are monitored by integrated controller 1 include OAT, cabin/cockpit temperature, SOC of hybrid APU 2, remote control override, and GOG 101. Control variables include an on/off setting for ECS controller 6 as a function of time and a battery preheat on/off setting as a function of time. Output 610 from integrated controller 1 to hybrid APU 2 includes commands for an open/close relay command and a battery preheat command. Output 620 from integrated controller 1 to ECS controller 6 includes commands 620 for turning ECS controller 6 on or off and to set a target temperature for precooling or preheating.

Input variables for hybrid APU 2 include battery status for battery modules 201, which may include voltage, current, SOC, temperature, and capacity. Control variables include an open/close relay. Output 630 from hybrid APU 2 to integrated controller 1 includes status information such as on or off, voltage, current, SOC, battery temperature and capacity.

Input variables for ECS controller 6 include OAT and cabin/cockpit temperature. Control variables include on/off for compressor 601 and condenser 602, as well as on/off and speed control for cabin evaporators 603, 604. In embodiments having a variable-speed VCCS compressor motor, compressor motor speed may also be an optional control variable. Output 640 from ECS controller 6 to integrated controller 1 includes on/off status, OAT, and cabin/cockpit temperature.

FIG. 7 shows an exemplary preconditioning page 700 of software application 3. Preconditioning refers to temperature control for preheating or precooling the cockpit and cabin. As used in this application, the term "page" should be considered to include a particular configuration of displayed icons and information. Example pages include pages 700, 800, 900, 1000, 1100, and 1200, shown in FIGS. 7-12, respectively.

Preconditioning page 700 includes a plurality of high-level buttons 702-710 that provide access to other features in addition to preconditioning, as described below. As used in this application, the term "buttons" should be considered to include any device for providing input by the user. Example buttons include interactive icons or indicators displayed on a touch-screen that are touchable, icons/indicators displayed on a computer screen that are clickable (e.g., with a mouse), or actual physical buttons or switches. For mobile device 301 having a touch-screen, buttons are configured to receive input when touched by a user and provide access to additional information and/or options, which may be in the form of additional pages. Buttons may be continuously displayed as a user navigates between a plurality of pages (e.g., buttons 702-710 are shown in FIGS. 7-12), whereas other buttons may be specific to a particular page (e.g., buttons 720-740 are specific for preconditioning page 700).

A temperature button 702, which may include a thermometer icon for rapid identification, provides access to preconditioning page 700, as described below in connection with FIGS. 7 and 8. A tire pressure button 710, which may include a tire cross-section icon, provides access to a tire pressure page 900, as described below in connection with FIG. 9. A battery button 706, which may include a battery icon for rapid identification, provides access to battery status page 1000, as described below in connection with FIG. 10. A fuel button 708, which may include a fuel-pump icon for rapid identification, provides access to fuel status page 1100, as described below in connection with FIG. 11. A security and surveillance button 704, which may include a camera icon for rapid identification, provides access to a security and surveillance page 1200, as described below in connection with FIG. 12.

Returning to FIG. 7, preconditioning page 700 further includes a plurality of buttons specific to preconditioning 720-740. Master control yoke heater button 720 provides a master switch to turn on/off both control yoke heaters 501. Master seat heater button 725 provides a master switch to turn on/off all pilot seat heaters 502 and all passenger seat heaters 504. Individual control-yoke heater buttons 721 enable switching on/off the pilot and co-pilot control-yoke heaters 501, FIG. 1. Individual pilot seat heater buttons 722 enable switching on/off the seat heaters for the pilot 502 and co-pilot 503, FIG. 1. Individual passenger seat heater buttons 724 enable switching on/off individual passenger seat heaters 504, FIG. 1. Each heater button displays the current status (e.g., on or off) of the respective heater with optional color changes (e.g., green for on, red for off), while touching each button toggles the respective heater between on and off.

A precooling button 730 indicates whether ECS controller 6 is operating to cool the cabin/cockpit, in which case the control-yoke and seat heaters are automatically turned off. A target-temperature indicator 735 provides an interactive button that may be used to switch from preconditioning page 700 to temperature control page 800, FIG. 8, described below. Target-temperature indicator 735 displays the target temperature (e.g., 15 degrees ° C.) and the target time in coordinated universal time (UTC). The present time may be displayed by mobile device 301 independently from, or within, preconditioning page 700. Cabin-temperature indicator 740 displays the current cabin temperature (e.g., −10° C.). Outside-air-temperature indicator 745, which displays the current OAT (e.g., −20° C.), may be displayed on additional pages, such as tire pressure control page 900, FIG. 9 and fuel status page 1100, FIG. 11, for example.

FIG. 8 shows temperature control page 800. Temperature control page 800 is a subset of preconditioning page 700, such that temperature control page is accessed by one or more buttons of preconditioning page 700, such as target-temperature indicator 735, for example. A cockpit temperature slider 850 provides an interactive button that may be slid left or right for decreasing or increasing, respectively, the cockpit temperature. A cabin temperature slider 855 is similar to cockpit temperature slider 850 for providing temperature control of the cabin. An interactive clock 857 may be used to set the target time. Temperature button 702 may be used to return to preconditioning page 700 following setting of the target temperature and time.

Figure 9:
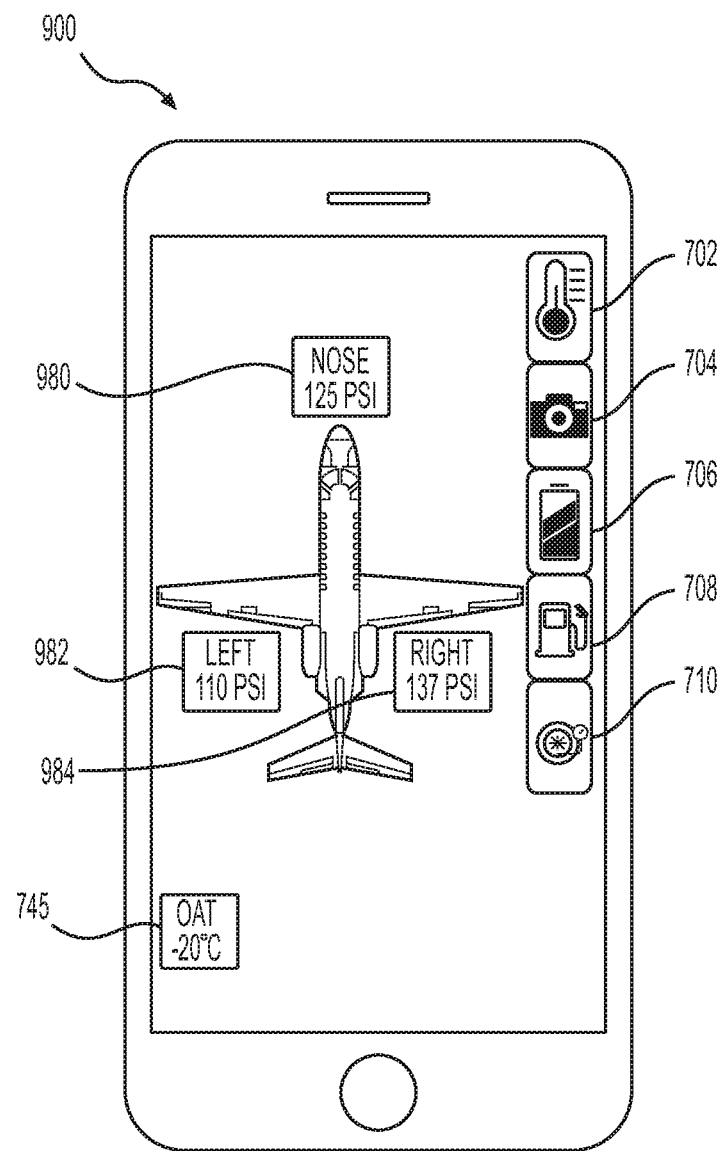
FIG. 9 shows a tire pressure status page of the software application of FIG. 1, in an embodiment.

FIG. 9 shows tire pressure control page 900, which may be accessed from any page of software application 3 via tire pressure button 710. A nose tire indicator 980 displays a current pressure for a nose tire (e.g., 125 pounds per square inch (PSI)). A left tire indicator 982 displays the current pressure for a left tire (e.g., 110 PSI). A right tire indicator 984 displays a current pressure for a right tire (e.g., 137 PSI). Tire indicators 980, 982, and 984 may include color-coded displays of tire pressure. For example, nose indicator 980 and right indicator 984 may be displayed with green font to indicate an acceptable tire pressure, whereas left indicator 982 may be displayed with red font to indicate a low tire pressure or excessive tire pressure.

Figure 10:
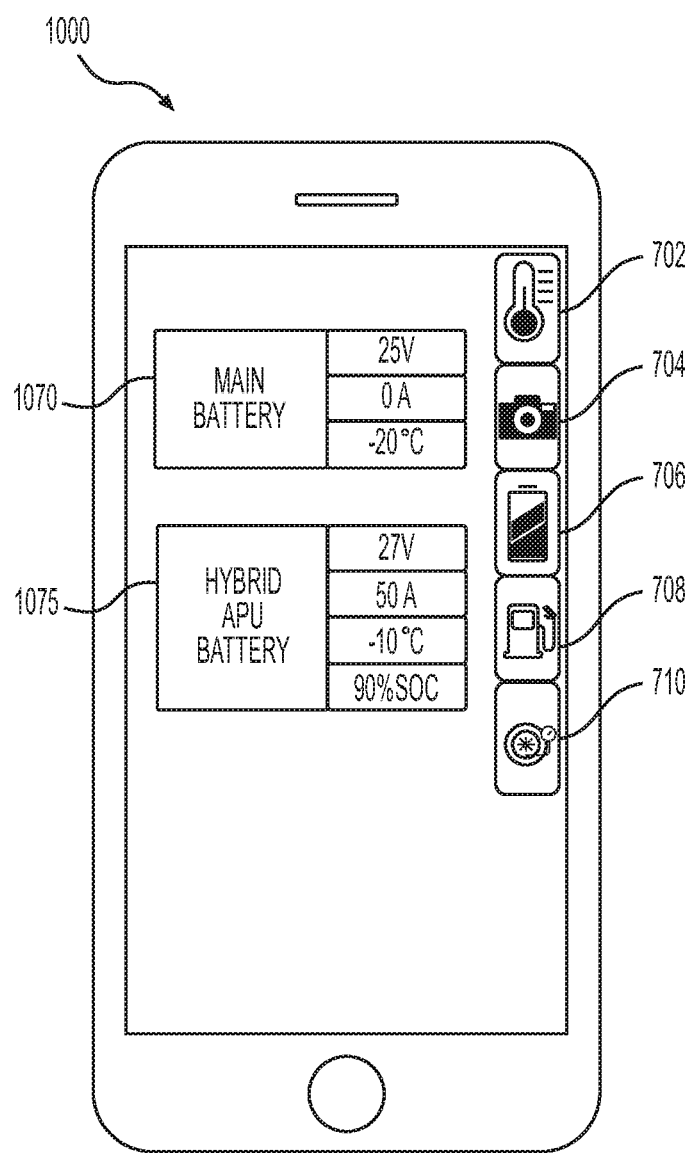
FIG. 10 shows a battery status page of the software application of FIG. 1, in an embodiment.

FIG. 10 shows battery status page 1000, which may be accessed from any page of software application 3 via battery button 706. A main battery indicator 1070 displays status information for main battery module 103, FIG. 1, including for example, battery voltage (e.g., 25 Volts (V)), current (e.g., 0 Amps (A)), and temperature (e.g., −20° C.). A hybrid-APU battery indicator 1075 displays status information for one or more battery modules 201 of hybrid APU 2, FIG. 1, including for example, voltage (e.g., 27 V), current (e.g., 50 A), temperature (e.g., −10° C.), and SOC (e.g., 90%). Battery indicators 1070, 1075 may be color-coded to provide an overall readiness indication. For example, main battery indicator 1070 may be highlighted with red borders to indicate that the battery temperature is too low, whereas hybrid-APU battery indicator 1075 may be highlighted with green borders to indicate that hybrid APU 2 is ready for use. The border color may also change based on the values of other key parameters such as voltage, current, temperature or others.

Figure 11:
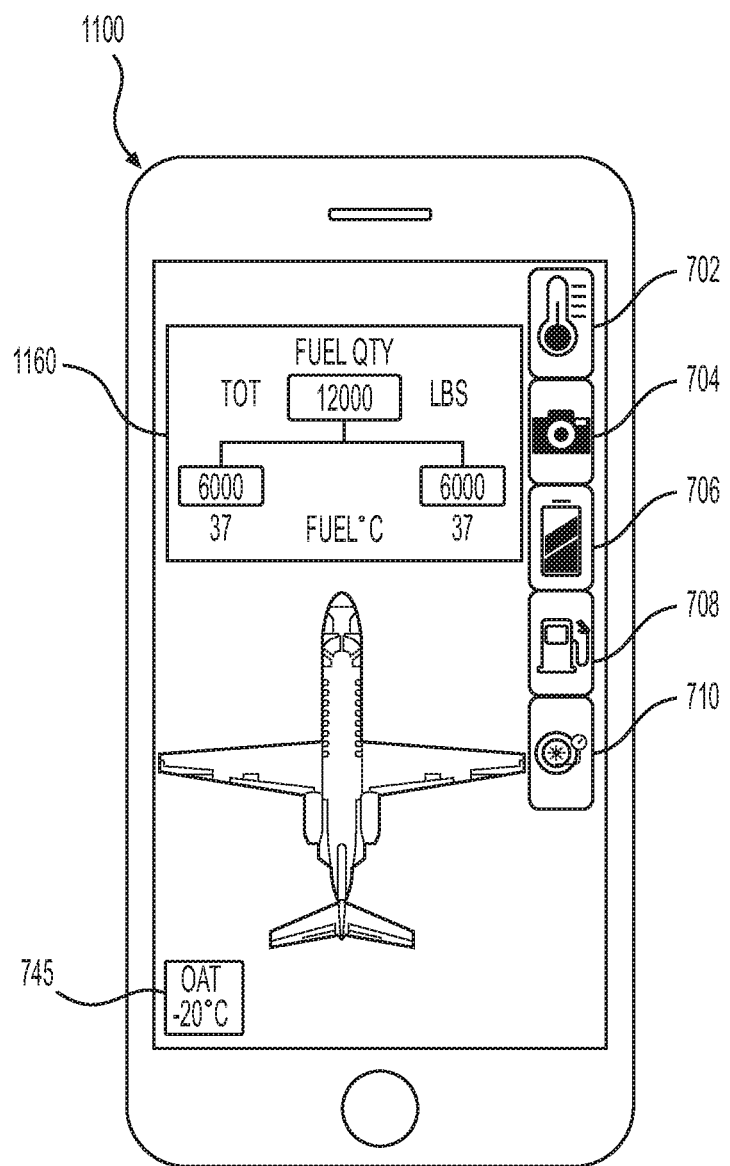
FIG. 11 shows a fuel status page of the software application of FIG. 1, in an embodiment.

FIG. 11 shows fuel status page 1100, which may be accessed from any page of software application 3 via fuel button 708. A fuel tank indicator 1160 may display a total fuel quantity (e.g., 12,000 pounds (lbs)), as well as individual quantities for a left fuel tank and a right fuel tank (e.g., 6000 lbs each). Fuel tank indicator 1160 may also display the temperature of each fuel tank (e.g., 37° C.).

FIG. 12 shows security and surveillance page 1200, which may be accessed from any page of software application 3 via security and surveillance button 704. A camera view 1290 displays a live view from a camera, such as a camera positioned on the left wingtip providing a view of the left nacelle and vertical stabilizer, as depicted in FIG. 12. A camera indicator 1291 enables selection of the left wingtip camera for display in camera view 1290. A plurality of other camera indicators 1292 may be used to select other cameras for display in view 1290. In certain embodiments, one or more cameras may be actively recording despite not being actively displayed in camera view 1290. A visual cue of the respective camera indicator (e.g., a color change or solid/dashed lines of the respective indicator border) may be used to indicate an actively recording camera. Door-lock indicators 1294, 1295 include closed and open padlock icons to indicate locked and unlocked doors, respectively, for both passenger and crew member doors, as well as storage compartment doors. In certain embodiments, door-lock indicators 1294, 1295 are interactive for receiving user input to change a locked/unlocked status of a respective door.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Not all operations listed in the various figures need be carried out in the specific order described.

We claim:

1. An expedited preflight readiness system for an occupiable aircraft, comprising:
an auxiliary power source having one or more battery modules for storing electrical power, the auxiliary power source being electrically coupled to a plurality of aircraft subsystems on the occupiable aircraft for enabling preflight readiness and powering the plurality of aircraft subsystems when a primary power source is unavailable;
an integrated controller electrically and communicatively coupled with the auxiliary power source for monitoring and controlling the auxiliary power source to provide electrical power to one or more of the plurality of aircraft subsystems; and
a mobile device communicatively coupled with the integrated controller via a server, the mobile device configured to initiate display status information about the plurality of subsystems for monitoring preflight readiness and for communicating instructions to the integrated controller for initiating preflight readiness, wherein the mobile device is configured to receive selections for starting one or more of the plurality of aircraft subsystems prior to arrival of a flight crew at the location of the occupiable aircraft.

2. The system of claim 1, wherein the mobile device is configured to: (i) remotely initiate aircraft preflight preparations via the integrated controller; (ii) provide remote monitoring of the plurality of aircraft subsystems; and (iii) receive selections for starting one or more of the plurality of aircraft subsystems, all while the aircraft is unattended and without the use of cockpit presets.

3. The system of claim 1, wherein the auxiliary power source is configured to provide electrical power under control of the integrated controller to an avionics suite of the aircraft enabling remote preflight checks using the mobile device.

4. The system of claim 1, wherein the mobile device is configured to display temperature readings for an aircraft cockpit via a plurality of interactive temperature indicators, the plurality of interactive temperature indicators each configured to receive a selection for setting a target temperature of the aircraft cockpit.

5. The system of claim 1, wherein the mobile device is configured to display a voltage value, a current value, a temperature value, and a state-of-charge value for the auxiliary power source.

6. The system of claim 1, wherein the mobile device is configured to present of a tire pressure indicator for displaying a tire pressure for each of a respective plurality of tires onboard the aircraft.

7. The system of claim 1, wherein the mobile device is configured to enable selection of a fuel quantity indicator for displaying a quantity of fuel in one or more fuel tanks.

8. The system of claim 1, wherein the mobile device is configured to present of one of a plurality of security-camera icons, the selection of any of the icons in the plurality of icons activating a respective security camera to display a live camera view of an aircraft component on the mobile device.

9. The system of claim 1, wherein the mobile device is configured to enable selection one of a plurality of interactive door-lock indicators; the mobile device further configured to allow displaying a locked or unlocked status of a plurality of aircraft doors, the plurality of interactive door-lock indicators further enabling remote locking and unlocking of the plurality of aircraft doors.

10. A method for preconditioning an aircraft, the aircraft having an integrated controller electrically and communicatively coupled with a plurality of aircraft subsystems, the method comprising:
receiving a selection for a target temperature for a crew compartment onboard the aircraft;
receiving a selection for a target time to reach the target temperature;
measuring a current temperature and an outside air temperature;
calculating an amount of energy to reach the target temperature based on the current temperature, the target temperature, the outside air temperature, and the target time;
determining a state-of-charge of an auxiliary-power-unit (APU); and
activating an environmental control subsystem for preconditioning the aircraft by adjusting the current temperature according to a preconditioning profile based on at least two of: (i) the target temperature, iii) the target time, (iii) the current temperature, (iv) the outside air temperature, (v) the amount of energy, and (vi) the state-of-charge of the APU.

11. The method of claim 10, wherein receiving the selection for the target temperature and the target time is via a mobile device such that activating the environmental control subsystem for preconditioning the crew compartment onboard the aircraft occurs remotely prior to arrival of personnel at the aircraft.

12. The method of claim 11, further comprising displaying the target temperature and the current temperature via the mobile device for one or more of a cockpit, a cabin, a storage compartment, a seat, and a pilot control interface of the aircraft.

13. The method of claim 11, further comprising activating electric heaters for remotely activating wing deicing equipment on the aircraft.

14. The method of claim 11, wherein activating the environmental control subsystem for preconditioning the aircraft comprises:
   activating one or more heaters when the current temperature is less than the target temperature; and
   activating one or more of vapor-cycle-cooling subsystems (VCCS) when the current temperature is greater than the target temperature.

15. The method of claim 14, further comprising operating a variable-speed compressor motor of the one or more vapor-cycle-cooling subsystems at a reduced speed to reduce energy use based on the preconditioning profile.

16. The method of claim 15, further comprising operating the variable-speed compressor motor continuously at a reduced speed to provide a consistent and quieter environmental noise signature by avoiding intermittent high-current discharge surges from the APU.

17. The method of claim 15, further comprising operating the variable-speed compressor motor at different speeds to facilitate estimation of energy usage and to facilitate determination of a precooling profile based on a constant cooling rate as opposed to a constant compressor speed.

18. An expedited preflight readiness method for an occupiable aircraft, comprising:
   sending a signal via a mobile device to a server;
   determining whether the signal is a request for data or a command to operate an aircraft environmental control subsystem; and
   when the signal is a request for temperature data,
      searching aircraft diagnostic data of the server for the temperature data; and
      transmitting the temperature data from the server to the mobile device for display; and
   when the signal is a command for a target temperature,
      transmitting the command to an integrated controller for operating the aircraft environmental control subsystem for preconditioning an aircraft cabin temperature; and
      transmitting status of the aircraft cabin temperature to the mobile device for displaying progress towards the target temperature.

19. The method of claim 18, further comprising authenticating a user of the mobile device.

20. The method of claim 18, further comprising preprogramming preflight readiness instructions onboard the aircraft prior to shut down, such that the integrated controller automatically operates the environmental control subsystem for preconditioning the aircraft cabin temperature at a prescheduled time without receiving a command from the mobile device.

* * * * *